United States Patent
May et al.

(10) Patent No.: US 7,987,632 B2
(45) Date of Patent: Aug. 2, 2011

(54) EXPERT SYSTEM FOR CONTROLLING PLANT GROWTH IN A CONTAINED ENVIRONMENT

(75) Inventors: George A. May, Slidell, LA (US); Mark Allen Lanoue, Long Beach, MS (US); Matthew Bethel, Slidell, LA (US); Robert E. Ryan, Diamondhead, MS (US)

(73) Assignee: The Institute for Technology Development, Stennis Space Center, MS (US)

( * ) Notice: Subject to any disclaimer, the term of this patent is extended or adjusted under 35 U.S.C. 154(b) by 37 days.

(21) Appl. No.: 12/581,579

(22) Filed: Oct. 19, 2009

(65) Prior Publication Data

US 2010/0042234 A1 Feb. 18, 2010

Related U.S. Application Data

(62) Division of application No. 11/312,464, filed on Dec. 21, 2005, now Pat. No. 7,617,057.

(51) Int. Cl.
*A01G 9/14* (2006.01)
(52) U.S. Cl. .................................... 47/17; 47/DIG. 6
(58) Field of Classification Search ......... 47/17, 58.1 R, 47/58.1 LS, DIG. 6, 69, 101 R, 66.6, 60, 47/61; 382/110; 706/45–46, 60–62
See application file for complete search history.

(56) References Cited

U.S. PATENT DOCUMENTS

| | | |
|---|---|---|
| 3,905,153 A | 9/1975 | Enter |
| 4,077,158 A | 3/1978 | England |
| 4,430,828 A | 2/1984 | Oglevee et al. |
| 4,543,744 A | 10/1985 | Royster |
| 4,567,732 A | 2/1986 | Landstrom |
| 5,046,362 A | 9/1991 | Strubbe |
| 5,282,389 A | 2/1994 | Faivre et al. |
| 5,283,974 A | 2/1994 | Graf, Jr. |
| 5,467,271 A | 11/1995 | Abel et al. |
| 5,764,819 A | 6/1998 | Orr et al. |
| 6,567,537 B1 | 5/2003 | Anderson |
| 6,725,598 B2 | 4/2004 | Yoneda et al. |
| 6,813,544 B2 | 11/2004 | Hood et al. |
| 6,842,009 B2 | 1/2005 | Potter |
| 7,206,772 B2 | 4/2007 | Tolley |
| 7,472,513 B2 | 1/2009 | Bula |
| 2004/0034459 A1 | 2/2004 | Hoelscher et al. |
| 2004/0186813 A1 | 9/2004 | Tedesco et al. |
| 2005/0104771 A1 | 5/2005 | Terry et al. |

FOREIGN PATENT DOCUMENTS

JP 03040002 A * 2/1991

* cited by examiner

*Primary Examiner* — T. Nguyen
(74) *Attorney, Agent, or Firm* — Crowell & Moring LLP

(57) ABSTRACT

In a system for optimizing crop growth, vegetation is cultivated in a contained environment, such as a greenhouse, an underground cavern or other enclosed space. Imaging equipment is positioned within or about the contained environment, to acquire spatially distributed crop growth information, and environmental sensors are provided to acquire data regarding multiple environmental conditions that can affect crop development. Illumination within the contained environment, and the addition of essential nutrients and chemicals are in turn controlled in response to data acquired by the imaging apparatus and environmental sensors, by an "expert system" which is trained to analyze and evaluate crop conditions. The expert system controls the spatial and temporal lighting pattern within the contained area, and the timing and allocation of nutrients and chemicals to achieve optimized crop development. A user can access the "expert system" remotely, to assess activity within the growth chamber, and can override the "expert system".

7 Claims, 4 Drawing Sheets

EXPERT SYSTEM FOR CONTROLLING PLANT GROWTH IN A CONTAINED ENVIRONMENT

This application is a divisional of U.S. patent application Ser. No. 11/312,464, filed Dec. 21, 2005, the content of which is hereby incorporated by reference into this application.

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of Specific Cooperative Agreement No. NCC8-221 awarded by the National Aeronautics and Space Administration ("NASA").

BACKGROUND OF THE INVENTION

The present invention is directed to a method and apparatus for controlling crop growth including plant tissue culture within a contained environment. In particular, the invention uses an "expert system" to automatically and/or remotely monitor and control environmental inputs to crops, to achieve optimum uniform crop growth within the contained environment, while utilizing the minimum necessary expenditures for nutrients and energy.

In space exploration and development, for example, an expert system is necessary for bioregenerative Advanced Life Support (ALS) systems, because of the extreme limitations on crew time that might be available for monitoring the plant productions units. In any future human exploration missions (such as to the Moon or Mars, for example), it is likely that the ALS systems will not be constantly (and perhaps not even frequently) monitored by the human crew. Furthermore, there will be no "experts" in the crew that will be trained in all aspects of plant biology or system maintenance.

On Earth there are also needs for such a system. For example, growing plants that are genetically engineered to produce pharmaceuticals in many cases will require containment. Biopharming or molecular farming can employ this system to eliminate comingling and or contamination concerns between traditional plants and plants grown to produce drugs and vitamins to support human life on earth.

Accordingly, there is a need for a system which can control crop growth in a remotely situated contained environment, with little or no human intervention. Due to the difficulties which may be encountered in delivering energy and essential nutrients to such a remote location, it is also important that such a system also be capable of optimizing crop growth in terms of crop yield, growth time and the consumption of energy and nutrients. Finally, in order to permit human intervention where necessary, such system should also include facilities for communication between the system itself, which is situated at the remote site, and a user via a distant interface, so that the user may discourse with and override the expert system where necessary or appropriate.

The use of aircraft or satellite remote sensing, including multispectral imaging to assess crop or vegetation growth and plant stress is known. U.S. Pat. No. 5,467,271, for example discloses an airborne imaging system that produces georeferenced agricultural maps of cultivated fields, which show soil and vegetation characteristics. U.S. Pat. No. 6,813,544, on the other hand is directed to the collection of remotely sensed image data in order to monitor plant stress and to recommend remediation; and U.S. Pat. No. 6,567,537 provides a system that predicts plant stress and crop yields, using an algorithm that combines remotely sensed image data at 680 and 770 nm. Similarly, U.S. Pat. No. 5,764,819 discloses a methodology for using remotely sensed data to classify and separate genotypes, separate the population of inbred and hybrid plants and to mark the effects on plants due to environmental factors. Finally, published U.S. Patent Applications Nos. 2004/0034459 and 2005/0104771 both use remotely sensed data to assess plant condition.

None of these systems and methods, however, provides an autonomous expert system that is capable of detecting plant stress and recommending and implementing cultivation and/or remediation in order to optimize plant growth and minimize consumption of energy and nutrients in a remotely situated contained environment, taking into account a diverse range of environmental considerations, which may exist in an enclosed environment.

SUMMARY OF THE INVENTION

One object of the invention, therefore is to provide a system which optimizes crop yields, while minimizing consumption of inputs.

Another object of invention is to obtain optimized crop yields in a minimal time period (number of days to get plants to yield stage).

Another object of the invention is to provide a system that gives early warning, including pre-visual stress detection, of conditions which can affect crop growth.

A further object is to adapt the frequency and modulation of specific light to accelerate plant growth, provide uniform growth (minimize differences between plants), and minimize energy requirements.

Still another object of the invention is to provide a method and apparatus for remediation of adverse crop growth conditions and optimization of crop yields per unit of input, automatically, without requiring human intervention.

Yet another object of the invention is to provide a crop growth control system that can be manipulated remotely from the situs of crop growth.

These and other objects and advantages are achieved by the system for optimizing crop growth according to the invention in which vegetation is cultivated in a contained environment, such as a greenhouse, an underground cavern or other enclosed space. In the system according to the invention, imaging equipment is positioned within or about the contained environment, to acquire spatially distributed crop growth information, and environmental sensors are provided to acquire data regarding multiple environmental conditions that can affect crop development. Illumination within the contained environment, and the addition of essential nutrients and chemicals are in turn controlled in response to data acquired by the imaging apparatus and environmental sensors.

In order to achieve an optimal crop yield with little or no human intervention, both illumination and the addition of nutrients and chemicals are controlled by an "expert system" which is trained to analyze and evaluate crop conditions, for example using a heuristic technique. The expert system controls the spatial and temporal lighting pattern within the contained area, as well as the timing and allocation of nutrients and chemicals to achieve optimized crop development.

As is well known to those skilled in the art, an Expert System or knowledge based system (KBS) is an intelligent computer program designed to capture the knowledge, experience and problem-solving skills of one or more (human) experts in a particular domain. An Expert System is a decision support tool that does not require human experts to be present. It uses facts of the domain and heuristics contained in a knowledge base. (Heuristics include rules-of-thumb, judgments, and sometimes guesses.) The heuristics are usually expert specific (that is, specific to a particular human "expert"), and are based on the expert's experience. The user communicates with the Expert System through a user interface, which interface allows him or her to describe the problem, and to answer questions posed by the interference engine.

The expert system according to the invention monitors plant growth and alerts a central control if plants deviate from the optimal conditions. Ideally, the expert system is also trained to recommend remediation once a problem has been identified. Real-time data collected from the various monitoring devices can be utilized by the Expert System. These measurements include pH, oxygen and carbon dioxide levels, trace gases, temperature, and humidity. Aerosol monitoring is also performed to detect molds and diseases. Remotely sensed imagery, gathered for example from a multispectral and/or hyperspectral sensor system, detects plant stress and measures biomass, and plays an important role in ensuring an optimal harvest.

According to one embodiment of the invention, the system includes imaging of the root zone for additional plant health diagnostic information. The illumination for the root zone imaging is provided by plug-in, wavelength specific LED arrays, or by other devices such as lasers that allow for penetration and transmission of light, and an optically balanced material is utilized to build the root zone container to facilitate imaging.

According to another feature of the invention, the expert system can be accessed by a remote decision maker who is located at a substantial distance from the contained environment, via a communications channel, such as the internet and the world wide web, for example. It is of course apparent that the sensors, imaging devices, lighting equipment and nutrient input devices must be situated at the site of the contained environment. However, the expert system itself, and the remote decision maker can be situated anywhere, provided only that adequate communications are available. In this way, the remote decision maker can view and assess what is occurring inside the growth chamber, and he or she can also override the Expert System to control any component within the growth chamber.

According to still another feature of the invention, illumination within the contained environment is targeted only to areas where vegetation exists, by means of a matrix of individually operable light sources that have selected wavelengths. In addition, when individual light sources are delivering light to targeted areas within the contained environment, the emitted light is modulated in a manner that increases the photosynthesis process, reducing the amount of time needed for a plant to reach maturity.

The invention achieves the greatest plant production (yield) in the least amount of time (growing days), by providing the optimal environment to obtain accelerated photosynthesis and plant development. The daily operation of this plant growth expert system is efficient in terms of power requirements, nutrient expenses, requirements for gases and other inputs, because it provides only what the plant needs when the plant needs it. In essence uptake by the plant equals inputs to the growth chamber. This system also reduces the spatial variability of growth and production among the plants grown in this chamber which results in a uniform yield.

Other objects, advantages and novel features of the present invention will become apparent from the following detailed description of the invention when considered in conjunction with the accompanying drawings.

DETAILED DESCRIPTION OF THE DRAWINGS

Figure 1:
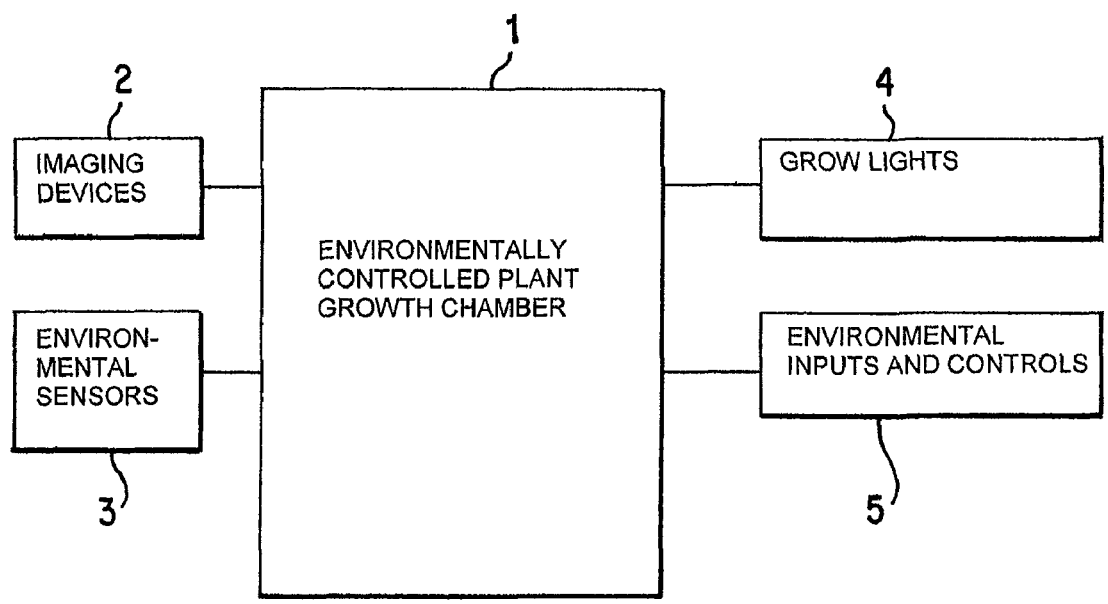
FIG. 1 is a block diagram which illustrates the environmental monitoring and control components of the optimized automated cultivation system according to the invention.

Referring now to the drawings, FIG. 1 is a conceptual block diagram which illustrates the various sensors and input devices which are used in conjunction with the environmentally controlled plant growth chamber 1. In particular, a suite of imaging devices 2 provides information regarding the distribution, and status of vegetation within the plant growth chamber. In addition, a suite of environmental sensors 3 is provided to detect environmental conditions within the plant growth chamber, as discussed previously. A suite of grow lights 4 are controlled in a manner described in greater detail hereinafter, and nutrients, chemicals and water are provided by the environmental inputs and controls 5.

Figure 2:
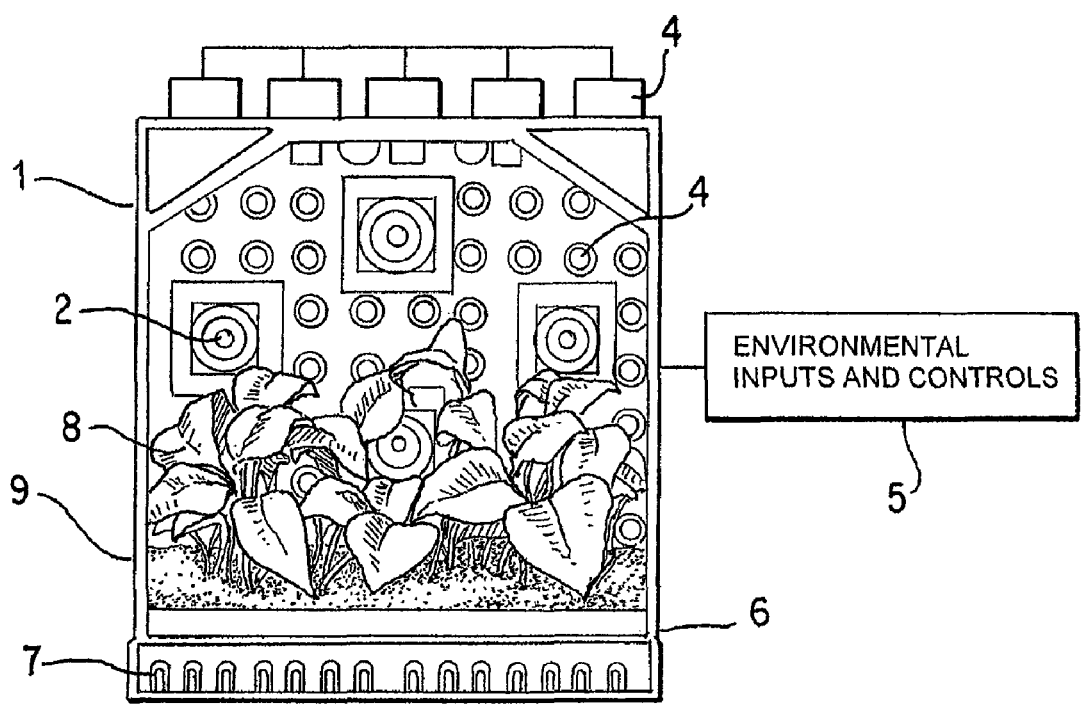
FIG. 2 is a schematic illustration of a plant growth chamber according to the invention.

FIG. 2 is a schematic depiction of the plant growth chamber of FIG. 1, which shows the distribution of lights and imaging devices. In particular, a matrix of grow lights 4 is distributed over the surfaces of the growth chamber. (The matrix array of individual light sources 4 can be seen in FIG. 2 across the back side of the growth chamber 1. In addition, overhead lights are depicted schematically.) As noted previously, each of the individual light sources in the lighting matrix is individually operable in order to distribute light within the growth chamber in any desired manner, as discussed hereinafter.

A matrix of imaging devices or cameras 2 are distributed about the surfaces of the plant growth chamber 1, as also shown in FIG. 2. These include not only cameras distributed about the top and side surfaces, but optionally cameras in the root zone as well. To illuminate the root zone, a matrix of light emitting diodes 7 is also included.

Within the interior of the plant growth chamber, vegetation 8 is shown as growing in a growth medium 9. Devices 5 for input of essential nutrients, chemicals and water are well known to those skilled in the art and are shown only schematically in FIG. 2.

Figure 3:
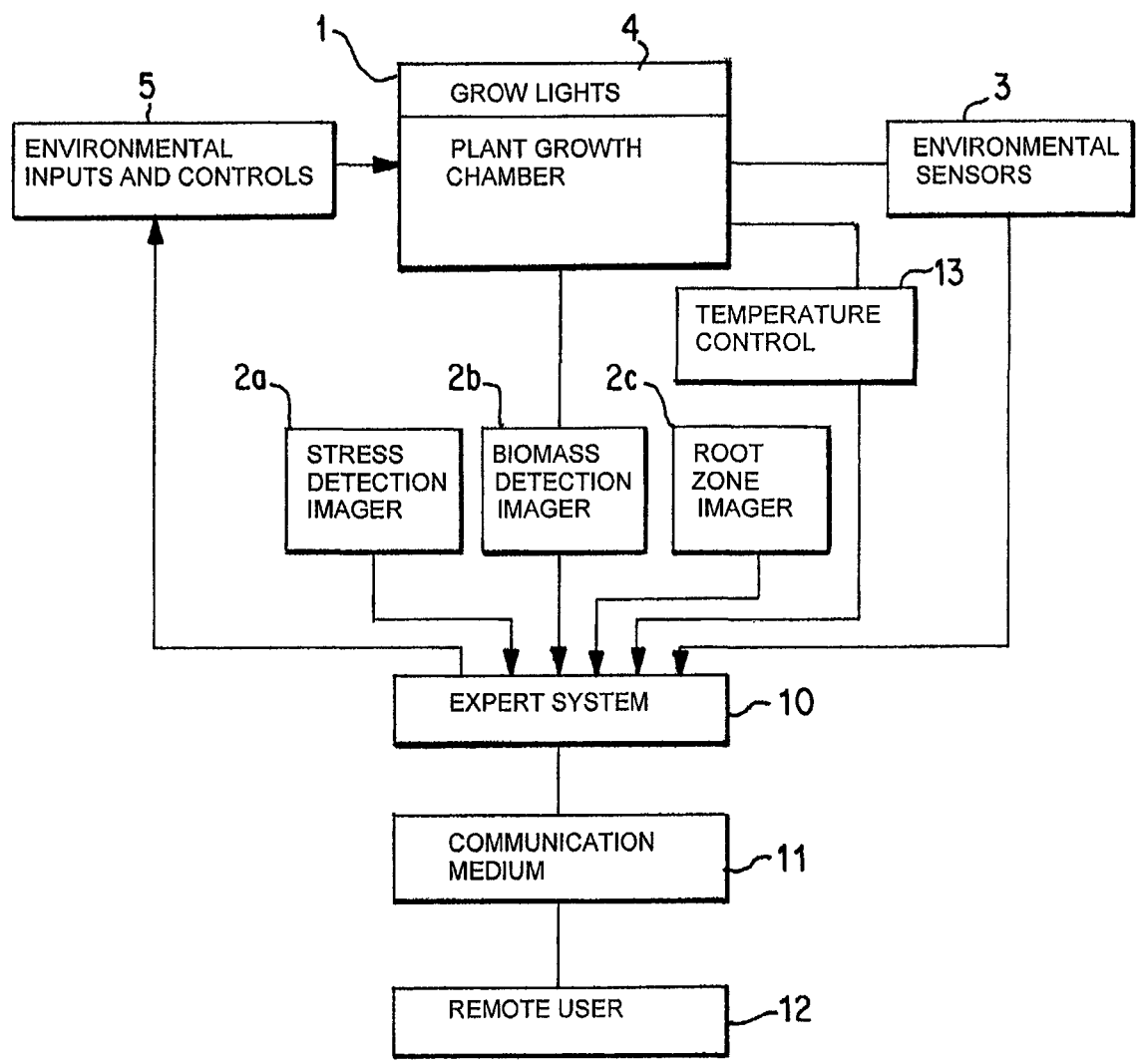
FIG. 3 is a schematic illustration of the overall system according to the invention.

FIG. 3 is an overview of the entire plant growth system according to the invention, including the expert system referred to previously. As can be seen, the expert system 10 is coupled to receive inputs from both the imaging devices 2 and the environmental sensors 3. In particular, as shown in FIG. 3, the imaging devices include one or more stress detection imagers 2a, biomass detection imagers 2b and root zone imagers 2c.

The expert system 10, in turn, is connected to the environmental input device for injecting nutrients, chemicals and water into the plant growth chamber as needed. As will be understood by those skilled in the art, the input apparatus 5, which is shown schematically, includes devices for applying the various inputs according to a desired distribution pattern within the plant growth chamber, based on instructions from the expert system.

The expert system in turn communicates with a remote user 12 via a communications medium 11. Depending on the exact location of the plant growth chamber and expert system, various communications media may be appropriate. For terrestrial applications, for example, the internet may be used in a manner that will be easily understood by those skilled in the art. Otherwise, for extraterrestrial applications, known telemetry and other communication techniques may also be used. Via these communication channels, the remote user 12, can communicate with the expert system, which may ask for input information from the remote user prior to making a determination as to the input and distribution of illumination and nutrients into the plant growth chamber.

Finally, a temperature control device 13 is provided to regulate the temperature within the growth chamber. Such temperature control may be achieved by a variety of known means, including heating elements, various types of heaters, and thermal (infrared) radiation.

The details of the above components, and the manner of their operation will now be discussed.

The plant biomass detection imager system 2b may be provided, for example, in the form of black and white digital cameras. The function of these cameras is to identify and map the location of each seedling/plant within the growth chamber, according to a predetermined grid pattern therein. The plant biomass detection imagers are used prior to illumination of the grow lights, to determine an optimum illumination pattern or light emission path of each grow light, as discussed in greater detail hereinafter. The biomass detection imagers are used multiple times within a 24-hour period to capture an image of all plants within the chamber. These data are also used in two or three dimensional stress detection algorithms, as discussed hereinafter.

The plant stress detection imager system 2a includes an imaging device or devices to capture images of all plants within a chamber numerous times within a 24-hour period. Examples of plant stress detection imaging devices or technology include multispectral and hyperspectral imaging devices (reflective and fluorescent), RAMAN, thermal (active and passive) luminescence, and photoacoustics. Time series of imaged data is another technique that can be used to detect plant stress.

Finally, the root zone imager system 2c identifies and maps the roots of each plant within the growth chamber, according to a fixed schedule. For example, the root zone imager may be operated at a frequency of once every 48 hours. In order to permit imaging of the root zone 6 (FIG. 2), the plants are grown in a material that allows for the penetration and transmission of light. The chamber itself is also constructed with a material that allows for the various lighting requirements.

Plant monitoring within the plant growth chamber includes two-dimensional, point and imaging sensors, and may even include magnetic resonance imaging for plants. Information acquired from these instruments includes spatial time series analysis (i.e., "droopy plant" time lapse photography, etc.) and includes two-dimensional and three-dimensional versions. Both macro and micro imaging spectroscopy, including reflective (multispectral, hyperspectral and texture analysis) fluorescent (multispectral, hyperspectral and kinetic), RAMAN, thermal (active and passive) and luminescence analysis are used. Non-imaging techniques may also be used, including photoacoustics and kinetic fluorescence.

Environmental monitoring 3 is accomplished using well known sensing devices (both point and/or imaging) which monitor environment conditions within the growth chamber. Monitored parameters include air temperature, relative humidity, moisture in the growth medium, $CO_2$ levels, root temperature, micro-balances for measurement of evapotranspiration/biomass, trace gas levels, nutrients, soil (medium) water and Ph. There is also monitoring and control of bioaerosal for disease detection and control. As noted previously, all of the latter information is input to the expert system 10, as depicted in FIG. 3, which uses it in the manner discussed previously, in order to make decisions regarding the input of water, chemicals and nutrients.

The environment within the growth chamber is regulated by the input of nutrients, chemicals and water by the input apparatus 5, in a manner which is known to those skilled in the art. Control quantities include irrigation/fertilization, temperature control, humidity control, control of $CO_2$ and other gases, and lighting control.

As noted previously, in order to promote rapid optimal plant growth within the growth chamber, the present invention also includes a precision lighting system.

The grow lights 4 illustrated in FIGS. 1 through 3, for example, include discrete wavelengths which are selected to accelerate plant growth. For example, grow lights may include light emitting diodes (LED's) which emit red, blue or green light, and include ultraviolet, near infrared and visible light.

The grow lights work in conjunction with the output from the biomass detection camera within the expert systems. They are arranged in a grid array of lights located about the plant chamber, particularly above the plants, but optionally on the sides of the chamber as well. The biomass detection camera determines where plant biomass is located within the chamber, and the latter information is used to turn on the grow lights in only those cells within the grid array that contain biomass. All the other grow lights (that is, those in cells having no biomass) remain off. This procedure minimizes the power consumed by the overall system, which is an important consideration in remotely situated cultivation programs.

Figure 4:
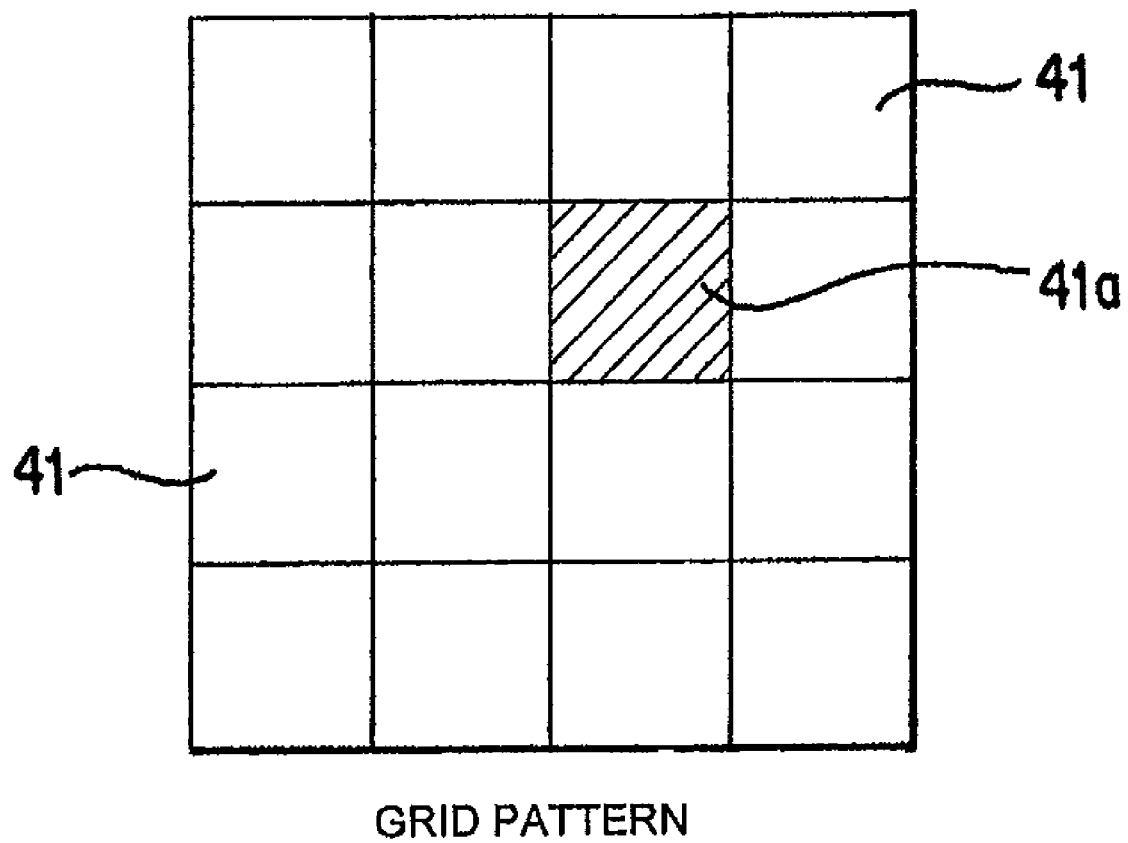
FIG. 4 is a diagram of an illumination matrix for use in the growth chamber of FIG. 1.

The grow lights 4 are distributed within a matrix and include discrete wavelengths, which are individually operated, so that light of a desired wavelength or wavelengths may be distributed exclusively to those cells within the grid matrix of the plant growth chamber in which biomass is present. This principle is illustrated schematically in FIG. 4, which shows a matrix of grid cells 41 of which only a single one 41a contains biomass. Accordingly, the grow light or lights for that cell are turned on, while all other grow lights remain off.

The grow lights may be selected to provide actinic light of 0 to 2000 micromoles per square meter per second. Spectral choices include red/blue dominant, approximately 10:1, with other colors. For fluorescence purposes, UV/red low level light is provided with temporal modulation. Finally, for reflectance purposes, white light LED's are used, although near infrared may be used for night illumination and for the purpose of developing a normalized difference vegetation index (NDVI).

In order to stimulate maximum plant growth, when the grow lights are activated they emit energy under a high frequency modulation, for example, having a period within a range of hundreds of microseconds to a few tens of milliseconds. Such modulation of the light sources increases photosynthesis, thus reducing the amount of time and energy needed to grow the plant and reach maturity.

The expert system, as shown in FIG. 3, constitutes the brains of the growth chamber. It receives measurements and images from all cameras and sensors, and analyzes that information to determine if a problem is occurring within the growth chamber. If so, it decides how to correct the problem and implements the correction. For example, if the carbon dioxide level within the growth chamber is too low for optimum growth, carbon dioxide is injected. Expert systems, as such, are well known, and use artificial intelligence techniques, as well as facts regarding the domain, and heuristics contained in a knowledge base, in order to provide a decision support tool.

The expert system includes specific data on the particular plants which are being grown in the growth chamber. Such information may include, for example: optimal grow light schedules; fertilizer schedule and optimum carbon dioxide, humidity, temperature and other environmental conditions within the growth chamber.

Images from the plant biomass detection camera 2b are sent to the expert system and overlaid, to generate time-lapse photography in two or three dimensions, in order to measure the growth dynamics and detect wilting of any plants within the growth chamber. Determining the atypical leaf and stem movements of the plant over a time period can be used as a plant stress detection mechanism. The amount of movement (ex. Droopiness) of each plant is calculated, and a determination of the cause or potential causes is made. Images from the plant stress detection imager 2a, on the other hand, are sent to the expert system and overlaid to provide spatial time series analysis (one-dimensional) of all plants within the growth chamber. The expert system performs classifications on these images to identify stress that is occurring in a plant, in a manner which is well known to those skilled in the art. Examples of classification algorithms within the expert system include the normalized difference vegetation index (NDVI) and other standard vegetation indices, clustering algorithms, maximum likelihood classifications, e-cognition, etc., all of which are well known to those skilled in the art.

Together with the communication medium 11, the expert system 10 therefore provides a system by which a person who is not located at the growth chamber can access all information on plant and environmental conditions within the growth chamber, for example, via the internet and the world wide web, in a process known as "tele-horticulture". The remote decision maker can interface with the expert system via a graphic user interface, a keyboard or other input/output device, and can provide information to the expert system as well as receive information from it. The remote decision maker can then override the expert system or resolve issues, to control any component within the growth chamber.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A system for achieving optimized crop growth, comprising:
   a growth chamber which is sealed off from an ambient environment;
   imaging means for acquiring and monitoring spatially distributed crop growth information within said growth chamber, said imaging means comprising at least one device selected from the group consisting of a multi-spectral imager, a hyperspectral imager, a RAMAN, a thermal luminescence imager and a photo acoustic imager;
   environmental monitoring means for acquiring and monitoring data regarding environmental conditions within said growth chamber;
   illumination and environmental control means for controlling illumination and environmental conditions in said growth chamber; and
   an expert system that is coupled to said imaging means and said environmental means, said expert system being trained to analyze and evaluate crop growth conditions within the growth chamber using a heuristic method, and to control said illumination and environmental control means to achieve optimized crop growth and minimum consumption of energy and nutrients, wherein said expert system controls said illumination in response to said spatially distributed crop growth information to achieve a spatial, spectral and temporal distribution of illumination within the growth chamber that optimizes plant growth, maximizes yield and minimizes power consumption.

2. The system according to claim 1, further comprising a communications link between said expert system and a remote terminal which includes a machine/human interface, whereby a remotely situated individual may communicate with and override said expert system.

3. The system according to claim 2, wherein said interface includes display means for displaying data from said detection and monitoring means, and diagnostic and environmental control determinations from said expert system.

4. The system according to claim 1, wherein, when light is being distributed to biomass within a particular cell, the light is modulated according to a predetermined temporal pattern.

5. The system according to claim 4, wherein said predetermined pattern includes modulating said light energy between first and second intensity levels at a predetermined frequency.

6. The system according to claim 5, wherein said first intensity is zero and said second intensity has a fixed predetermined value.

7. The system according to claim 6, wherein said predetermined frequency is selected from a range between 100 and 1000 hertz.

* * * * *